(No Model.) 3 Sheets—Sheet 1.

R. A. TOWNSEND & W. YATES.
BARREL.

No. 549,220. Patented Nov. 5, 1895.

Witnesses
Jas. Edmunds,
S. McBain

Inventors
Robert A. Townsend
William Yates
By P. J. Edmunds
Attorney

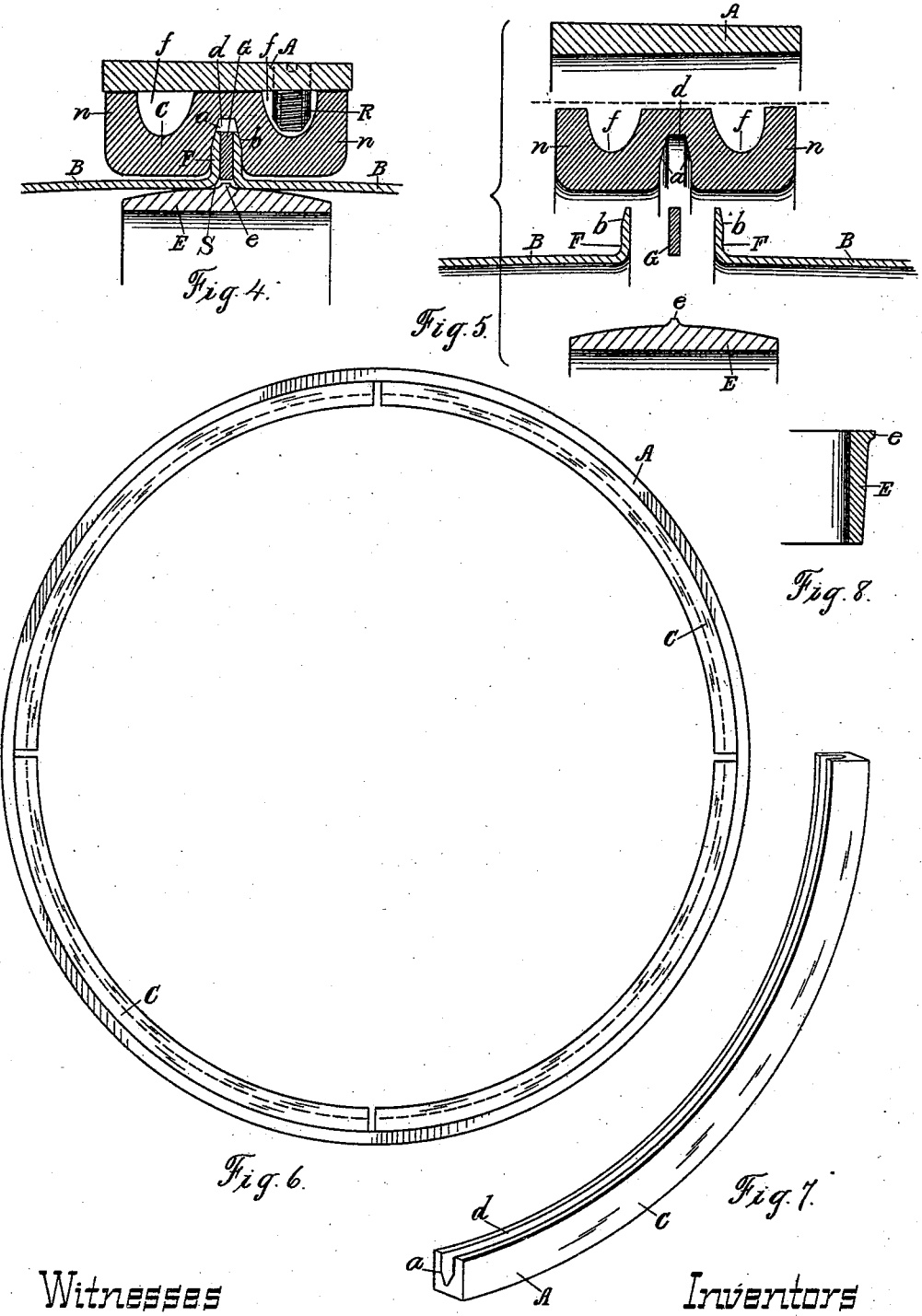

UNITED STATES PATENT OFFICE.

ROBERT A. TOWNSEND, OF KURRACHI, INDIA, AND WILLIAM YATES, OF LONDON, CANADA.

BARREL.

SPECIFICATION forming part of Letters Patent No. 549,220, dated November 5, 1895.

Application filed April 10, 1895. Serial No. 545,257. (No model.)

*To all whom it may concern:*

Be it known that we, ROBERT A. TOWNSEND, residing at Kurrachi, Sindh, India, and WILLIAM YATES, residing at London, Ontario, Canada, subjects of the Queen of Great Britain, have invented new and useful improvements on nesting barrels or packages and in fastening together sections of hollow vessels and tubes, of which the following is a specification.

This invention relates to improvements on barrels, tubs, packages, hollow vessels, tubes, and the like, and has for its object to provide a device for safely and securely holding liquids or other merchandise during transportation or storage; and these improvements consist of a section or sections, each provided with a flange at or near the rim, of a clamp having a groove formed therein and beveling said flange and tapering said groove, either or both, as preferred, and of an internal metallic hoop or ring formed of one rigid unbroken circular piece and securing means in connection with the above, whereby the whole is firmly clamped together to form a liquid and air tight joint where the sections are joined together.

In order that our improvements may be better understood, we have illustrated in the accompanying drawings a barrel constructed according to our invention, in which drawings—

Figure 1:
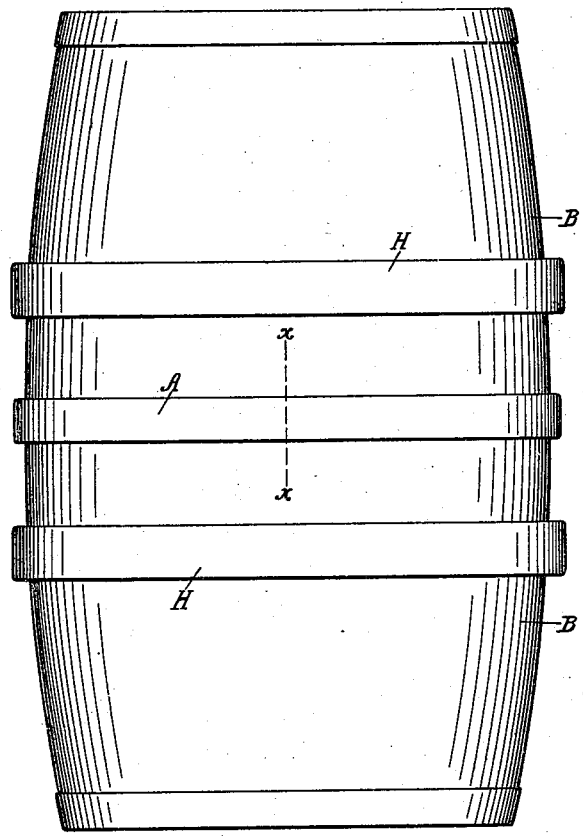
Figure 2:
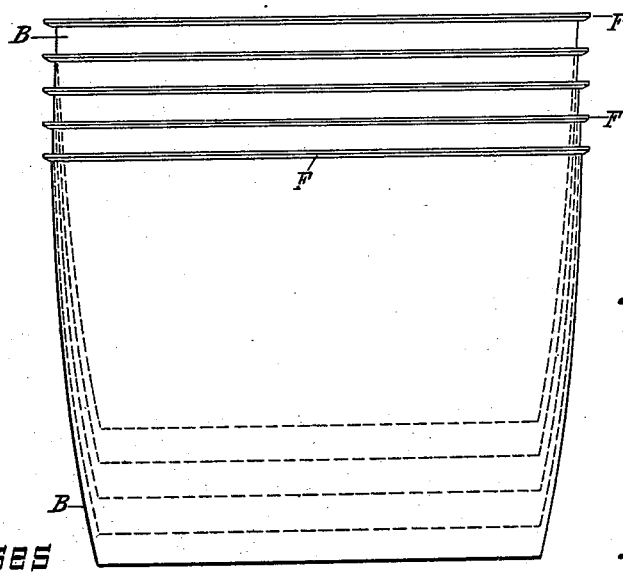
Figure 3:
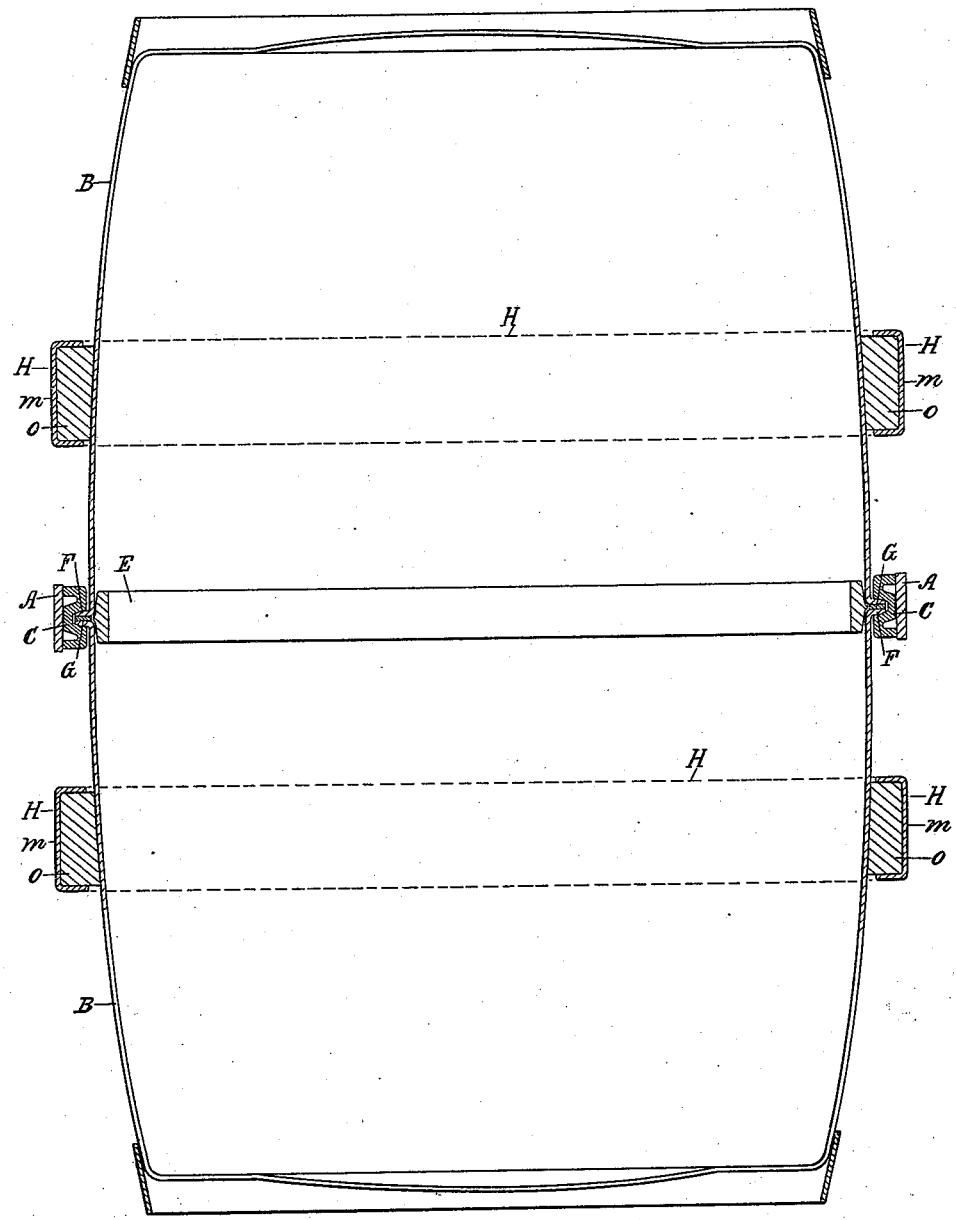

Figure 1 is a side view of a barrel embodying our invention. Fig. 2 shows the half-barrel sections nested together for shipment. Fig. 3 is an enlarged detail central longitudinal sectional view of Fig. 1. Fig. 4 shows a sectional view, full size, of one side of the barrel on the line $x\,x$ of Fig. 1. Fig. 5 is another view of Fig. 4, showing the parts separated. Fig. 6 is a plan view of the segmental clamps and clamping-band. Fig. 7 is a perspective view of a segmental clamp which is formed slightly different from that shown in Fig. 4. Fig. 8 shows a cross-sectional view of a modification of the internal hoop or ring.

As shown in the accompanying drawings, the body of this barrel is formed of two half-barrel sections B B and of the shape shown; but said body may be formed of any suitable size or shape and of steel or other suitable material and of two or more sections, as preferred, and may have an interior lining or not, as preferred, and these barrel or package sections B B may be stamped or otherwise formed out of one piece without any seam or joint; but they may be formed of one or more pieces, as preferred, and in the case of tubs one of the barrel-sections may have the function of a cover only, in which case the edge of the cover could take the place cf one of the flanges, and these sections B B are each formed or otherwise provided with a rim-flange F; but said flange may be at or near the rim, and one or both of said flanges may be beveled, as shown at $b$, or not, as preferred, and G designates a gasket or packing of copper or other suitable material which may be interposed between the flanges F F; or this packing G may be placed in the recess $d$ of the clamping-segments C and serve as a packing between the edge or side of the flanges F and said clamping-segments.

C C designate segmental clamps or clamping-sections, one, two, four, or any suitable number of which may be used, and in the concave face of these segmental clamps a tapered groove or recess $d$ is formed; and the outer faces of these segmental clamps C may be beveled or increase in diameter gradually toward one side, as shown particularly in Fig. 5, and cut away at $f$, as shown in Fig. 4, leaving the outer bearings $n\,n$.

A designates a clamping-band the inner face of which may be beveled, which band encircles the clamping-sections C C, and H H designate the hoops which protect the barrel, said hoops being formed of an outer shield of metal $m$, lined or filled with wood, paper, rope, or other material O.

E designates a rigid unbroken internal metallic ring or hoop, which bridges the joint of the sections B B when the latter are placed in proper position to be secured together, and this ring or hoop E is provided with a rib or flange $e$, which rib projects into and engages with the recess S at the inner edge of the junction of the sections B B. This hoop centers or holds the inner faces of said sections in line while the clamping-segments and band are being placed in position and while the clamping-segments are being moved over on the flanges F by the clamping-band, the hoop E being for the purpose of centering and strengthening the barrel at this point and the rib $e$ for preventing the accidental displacement of said hoop.

This barrel is put together as follows: The hoop or ring E, formed of one solid rigid unbroken circular piece, as hereinbefore stated, is placed in one of the sections B, so that the flange $e$ of the hoop or ring E will rest on the inner edge of said section. When adjusted as described, one half of said hoop or ring E will project into and the other half project upward from said section B. Another inverted section B is then placed in position on the first section, said inverted section being guided into position on the first section by the upwardly-projecting portion of the internal hoop or ring E. This centers or brings the internal faces of the adjacent sections B in line and in such relation to one another that the flange of said inverted section will rest true on the corresponding flange of the first or lower section or on the packing G, laid thereon. In the latter case the packing G will be between the flanges F F of said sections B B. The segmental clamps C are then placed around the barrel and over these flanges F, so that said flanges F will enter the recess $d$ of said clamps C. The edge of the clamping-band A is then placed over the edge of the smallest diameter of the segmental clamps C, and by pressing this band A over on said clamps the latter are moved over on the flanges F, and the farther said clamping-band A is moved over on the outer beveled face of the clamping-sections C the more tightly will the segmental clamps C be pressed on the flanges F F of the adjacent sections until the clamping-band A is in the position shown in Figs. 3 and 4, during which operation the internal hoop or ring E has been holding the internal faces of the sections B in line and the flanges F true on one another, and when the clamping-band A is adjusted, as shown in Fig. 4, it will be impossible under any circumstances to accidentally displace the clamping-sections C or the clamping-band A, and the latter may be additionally secured to said clamping-sections by locking-pins or screws R, engaging with the channels or recesses $f$, in the outer face of said clamping-sections, as shown in Fig. 4, and while the clamping-band A is being pressed over on or upward on the outer beveled face of the clamping-segments C C the beveled faces $b$ of the flanges F F and the tapered faces $a$ of the clamps C have been moving over on one another to compress the flanges F F together, and thereby clamping the packing G firmly in place to avoid and completely prevent the escape of the contents at this point; and the action of the clamping-band A on the outer bearings $m$ of the segmental clamps C, of the form shown in Fig. 4, is to compress the portion of the segmental clamp C near the outer edges of the groove $d$ tightly on the flanges F F near the body of the barrel—the result of the combined action of the clamping-band A moving upward on the outer beveled face of the segmental clamps C, which tightly compresses said segmental clamps C on the flanges F F, and the action of the segmental clamp C on the beveled faces $b$ of the flanges F F to compress them and the packing G tightly together, and the action of the clamping-band A on the bearings $n$ of the clamping-segments C to bind the latter tightly on the flanges F adjacent to the body of the barrel is to avoid and completely prevent the escape of the contents and at the same time make an air and liquid tight joint at this point, and consequently make the barrel, tub, or package air and liquid tight.

By an apparatus not shown pressure may be applied to the clamping-band A evenly throughout to remove it from the clamping-segments C, after which the latter, and if necessary the packing G, may be removed and the hoops H H knocked off, when the half-barrel sections may be adjusted or nested, as shown in Fig. 2, to occupy very little room when shipped, and by a suitable air and liquid tight screw, plug, or bung, in the end of the barrel the contents may be replenished or removed, as desired.

It will be readily understood that the beveled or tapered faces formed on the flanges F F or the tapered groove $d$, formed in the segmental clamps C, may be on either only or both or on one side of either or on both sides as preferred, and also that the clamping-band A may be heated to expand the same and thereby facilitate the placing of said band A in proper position on the segments C, the cooling of which band will shrink it on the segments C to further rigidly bind the whole together.

The construction herein shown and described we have found by experiment to give the best results; but while we prefer the construction shown we do not limit ourselves to the details thereof, as they may be modified in various ways without departing from the spirit of our invention. And, again, in the foregoing description of our invention we have referred to it as applied to a barrel or package composed of two or more sections; but this invention is equally applicable to the fastening together of sections of any hollow vessels or tubes.

Having thus described our invention, we claim—

1. The barrel, package, hollow vessel or tube composed of two or more sections, B, B, provided with the flanges, F, F, in combination with a packing, G, beveled clamping segments, C, and the clamping band, A, substantially as and for the purpose set forth.

2. The barrel, package, hollow vessel or tube composed of two or more sections, B, B, provided with the flanges, F, F, in combination with grooved clamping segments, C, beveled laterally on the outer face, and clamping band, A, as a means for tightly compressing said segments on said flanges, substantially as and for the purpose set forth.

3. The barrel, package, hollow vessel or tube composed of two or more sections, B, B, provided with the flanges, F, F, in combination with a packing, G, grooved clamping segments, C, beveled laterally on the outer face, and the clamping band, A, substantially as and for the purpose set forth.

4. The clamping band, A, and the locking pins or screws, R, in combination with the clamping segments, C, having a channel or channels formed in their outer face for the reception of said pins or screws, substantially as and for the purpose set forth.

5. The clamping band, A, and the locking pins or screws, R, in combination with the clamping segments, C, having a channel or channels, $f$, formed in their outer face for the reception of said pins or screws, and the package composed of the sections, B, B, provided with the flanges, F, substantially as and for the purpose set forth.

6. An internal hoop or ring, E, formed of one solid, rigid, unbroken circular piece, provided with a rib or flange, $e$, in combination with a barrel, package, hollow vessel or tube composed of sections having a recess, S, at the inner edge of the junction of said sections, formed by bending a portion of each section outward to form a flange thereon, substantially as and for the purpose set forth.

7. The barrel, package, hollow vessel or tube composed of two or more sections, B, B, provided with the flanges, F, F, in combination with the grooved clamping segments, C, the clamping band, A, and the internal hoop, E, substantially as and for the purpose set forth.

8. The barrel, package, hollow vessel or tube composed of two or more sections, B, B, provided with the flanges, F, F, beveled at $b$, in combination with the packing, G, internal hoop, E, grooved clamping segments, C, C, and the clamping band, A, substantially as and for the purpose set forth.

9. The barrel, package, hollow vessel or tube composed of two or more sections, B, B, provided with the flanges, F, F, in combination with the packing, G, internal hoop, E, grooved clamping segments, C, formed with a tapered or curved face or faces, $a$, and the clamping band, A, substantially as and for the purpose set forth.

10. The barrel, package, hollow vessel or tube composed of two or more sections, B, B, provided with beveled flanges, F, F, in combination with the packing, G, internal hoop, E, grooved and beveled clamping segments, C, C, provided with the bearings, $n, n$, and the clamping band, A, substantially as and for the purpose set forth.

11. The barrel, package, hollow vessel or tube, composed of two or more sections, B, B, provided with the flanges, F, F, in combination with the grooved clamping segments, C, beveled laterally on the outer face, and the clamping band, A, beveled laterally on the inner face, substantially as and for the purpose set forth.

12. A package composed of a section, B, provided with a flange, F, in combination with a cover fastened to said flange, F, by grooved clamping segments, C, beveled laterally on the outer face, and clamping band, A, substantially as and for the purpose set forth.

13. A package composed of a section, B, provided with a flange, F, and the packing, G, in combination with a cover fastened to said flange, F, by grooved clamping segments, C, beveled laterally on the outer face, and clamping band, A, substantially as and for the purpose set forth.

14. A package composed of a section, B, provided with a flange, F, the internal flanged hoop, E, and the packing, G, in combination with a cover fastened to said flange, F, by grooved clamping segments, C, and clamping band, A, substantially as and for the purpose set forth.

15. A package composed of a section, provided with a flange in combination with a cover fastened thereto by the grooved clamping segments, beveled laterally on the outer face, and the clamping band beveled laterally on the inner face, substantially as and for the purpose set forth.

16. The clamping band, A, and the locking pins or screws, R, in combination with the clamping segments, C, having a channel or channels formed in the outer face for the reception of said pins or screws, and the package composed of a section, B, provided with a flange, F, and a cover fastened to said section, substantially as and for the purpose set forth.

In testimony whereof we have signed in the presence of the two undersigned witnesses.

ROBERT A. TOWNSEND.
WILLIAM YATES.

Witnesses:
P. J. EDMUNDS,
S. McBAIN.